United States Patent Office 3,356,674
Patented Dec. 5, 1967

3,356,674
3 - C - HYDROXYMETHYL - 3,5 - DIDESOXY - L - LYXOFURANOSE AND ITS DERIVATIVES, AND A PROCESS FOR THE PRODUCTION THEREOF
Hiroshi Ikeda and Hatsuko Ikeda, Tokyo, Japan, assignors to Rikagaku Kenkyusho, Saitama-ken, Japan
No Drawing. Filed May 27, 1966, Ser. No. 553,297
Claims priority, application Japan, July 7, 1961, 36/23,674; Apr. 7, 1962, 37/12,744
15 Claims. (Cl. 260—209)

ABSTRACT OF THE DISCLOSURE

A novel aldose, a pure 3-C-hydroxymethyl-3,5-didesoxy-L-lyxofuranose (dihydrodesoxystreptose) and its derivatives having optical activity and a process for producing the same which comprises reducing an aqueous solution of 3-C-hydroxymethyl-3,5-didesoxy - L - lyxonolactone as the starting material with sodium amalgam or sodium borohydride, maintaining the reaction mixture at a pH from 2 to 4, and purifying the aldose formed in the said mixture by converting the same to selected derivatives and then decomposing the said derivatives to recover the pure aldose.

---

This application is a continuation-in-part of copending application Serial No. 205,101, filed June 25, 1962, and now abandoned.

The present invention relates to a process for production a novel aldose and its derivatives having optical activity. In particular, the present invention relates to a simple and economic process for producing a pure 3-C-hydroxymethyl-3,5-didesoxy-L-lyxofuranose which comprises reducing an aqueous solution of 3-C-hydroxymethyl-3,5-didesoxy-L-lyxono-γ-lactone to form 3-C-hydroxymethyl-3,5-didesoxy-L-lyxofuranose with either of sodium amalgam or sodium borohydride while maintaining the pH of the reaction mixture at from 2.0 to 4.0, converting impure 3-C-hydroxymethyl-3,5-didesoxy-L-lyxofuranose formed in said reaction mixture into methyldiacetyl-

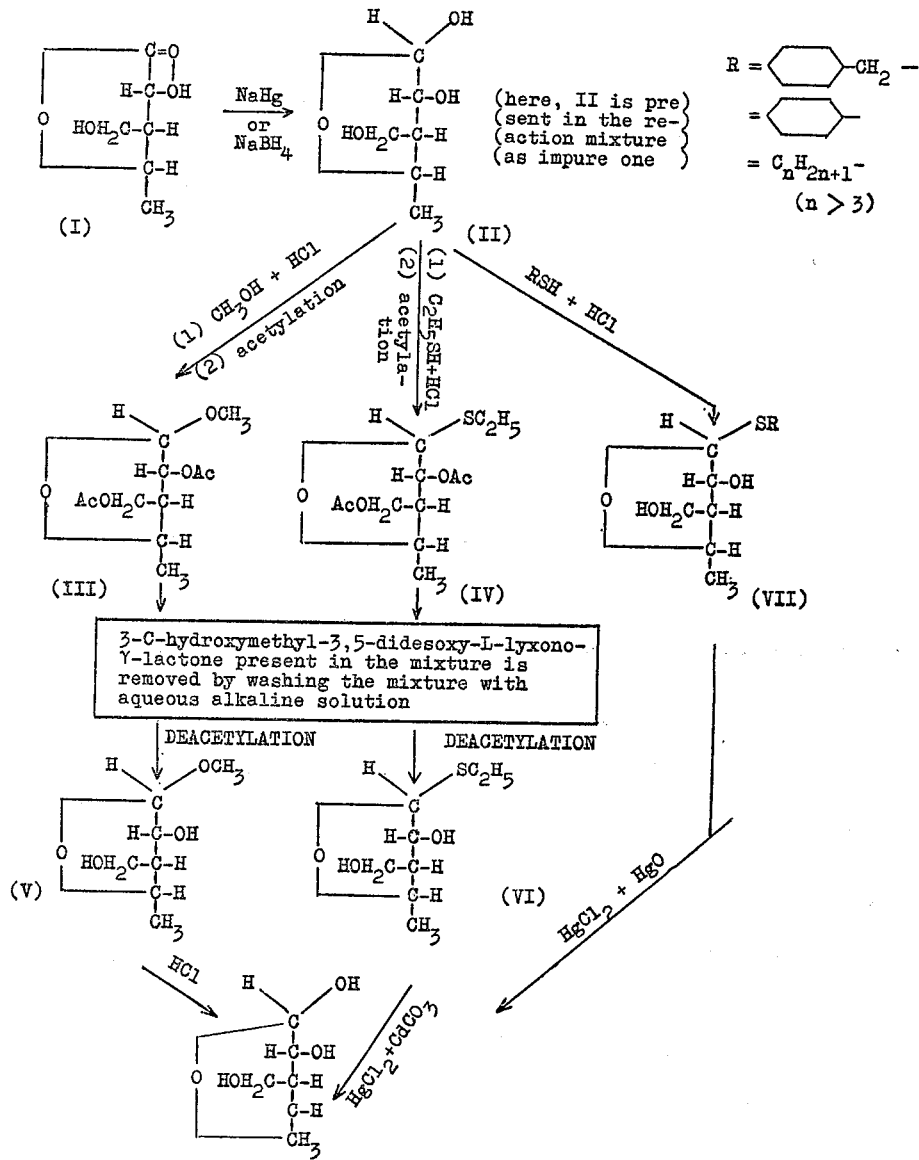

(Pure 3-C-hydroxymethyl-3,5-didesoxy-L-lyxofuranose)

3-C-hydroxymethyl-3,5-didesoxy-L-lyxofuranoside, ethyl-thio-diacetyl-3-C-hydroxymethl-3,5-didesoxy - L - lyxofuranoside, or mercaptal of 3-C-hydroxymethyl-3,5-didesoxy-L-lyxofuranose, obtaining the pure 3-C-hydroxymethyl-3,5-didesoxy-L-lyxofuranose by decomposing said derivatives thus formed. 3-C-hydroxymethyl-3,5-didesoxy-L-lyxono-γ-lactone to be used as the starting material in the present invention may be called as dihydrodesoxystreptosonic acid monolactone, which has the following structural formula:

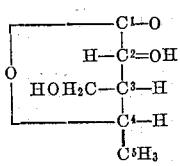

3-C-hydroxymethyl-3,5-didesoxy-L-lyxofuranose which is the object product of the present invention may be called as dihydrodesoxystreptose. It is a novel aldose having the following structural formula.

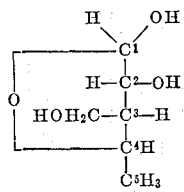

(I) 3-C-hydroxymethyl-3,5-didesoxy-L-lyxono-γ-lactone
(II) 3-C-hydroxymethyl-3,5-didesoxy-L-lyxofuranose
(III) Methyl-diacetyl-3-C-hydroxymethyl-3,5-didesoxy-L-lyxofuranoside
(IV) Ethyl-thio-diacetyl-3-C-hydroxymethyl-3,5-didesoxy-L-lyxofuranoside
(V) Methyl-3-C-hydroxymethyl-3,5-didesoxy-L-lyxofuranoside
(VI) Ethyl-thio-3-C-hydroxymethyl-3,5-didesoxy-L-lyxofuranoside
(VII) Benzyl-thio-3-C-hydroxymethyl-3,5-didesoxy-L-lyxofuranoside Phenyl-thio-3-C-hydroxymethyl-3,5-didesoxy-L-lyxofuranoside
n-Amyl-thio-3-C-hydroxymethyl-3,5-didesoxy-L-lyxofuranoside
n-Heptyl-thio-3-C-hydroxymethyl-3,5-didesoxy-L-lyxofuranoside An object of the present invention is to provide a novel compound which is an efficient intermediate for synthesizing a bactericide related to valuable antibiotic substances such as dihydrodesoxystreptomycin. Another object of the present invention is to provide a process for producing the above-mentioned novel compound.

It is known that dihydrodesoxystreptomycin, which is a widely-used and valuable antibiotic as a curative for tuberculosis, is composed of streptidine, N-methyl-L-glucosamine and dihydrodesoxystreptose (3-C-hydroxymethyl-3,5-didesoxy-L-lyxofuranose) which is obtainable by the process of this invention, as clearly seen from the following formulae. That is, the dihydrodesoxystreptomycin is obtained from dihydrodesoxystreptobiosamine and streptidine by the glucosidic linkage thereof, and the former compound dihydrodesoxystreptobiosamine obtained from the L-dihydrodesoxystreptose of this invention and N methyl-L-glycosamine by the glucosic linkage thereof.

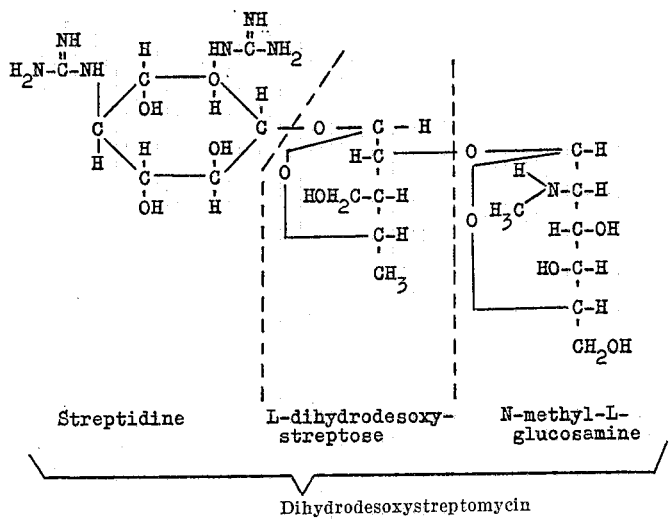

However, prior to the present invention, dihydrodesoxystreptose, streptose and dihydrostreptose, which are the central sugar moieties of dihydrodesoxystreptomycin, streptomycin and dihydrostreptomycin respectively, have never been isolated.

It is for the first time that dihydrodesoxystreptose (3-C-hydroxymethyl-3,5-didesoxy-L-lyxofuranose) is isolated by the method of the present invention.

This is a very important discovery in itself, because this compound has valuable utility as an intermediate for the synthesis of effective tuberculostatic agent.

That is, the use of this compound makes it possible to synthesize dihydrodesoxystreptomycin which has not been produced without use of certain microorganisms.

This compound can be synthetically produced by condensing N-methyl-L-glucosamine and the novel L-dihydrodesoxystreptose (3-C-hydroxymethyl-3,5-didesoxy-L-lyxofuranose) of this invention using Konigs-Knorr method to obtain dihydrodesoxystreptobiosamine, and then by condensing the thus-obtained product with streptidine to produce the compound, dihydrodesoxystreptomycin.

These synthetic reactions are diagrammatically represented as follows:

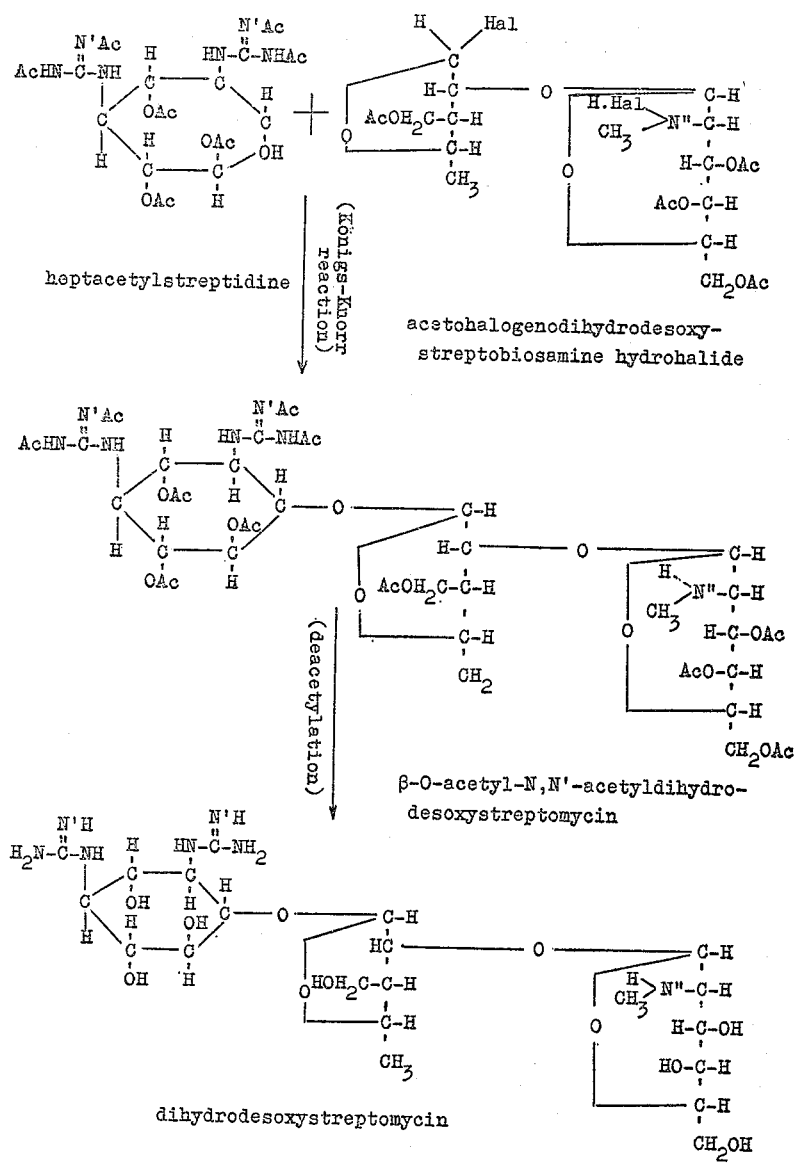

Generally speaking, 3-C-hydroxymethyl-3,5-didesoxy-L-lyxono-γ-lactone as the starting material is a kind of aldonic acid lactone, and 3-C-hydroxymethyl-3,5-didesoxy-L-lyxofuranose of the product is a kind of aldose.

As methods for producing aldose from aldonic acid lactone the following methods are described in literature already published.

(1) Catalytic Reduction Method:
   (a) A method of catalytic reduction of aldonic acid lactone (Journal of the American Chemical Society, 1935, vol. 57, p. 2204)
   (b) A method of catalytic reduction of aldonylchloride (Journal of the American Chemical Society, 1936, vol. 58, p. 2410; ibid, 1939, vol. 61, p. 1720)
   (c) A method of catalytic reduction of aldonylthiol ester (Journal of the American Chemical Society, 1946, vol. 68, p. 1455)

(2) Sodium Amalgam Method:
   (a) E. Fischer's method (Berichte der deutschen chemischen Gesellshaft, 1889, vol. 22, p. 2204)
   (b) Sperber's method (Journal of the American Chemical Society, 1947, vol. 69, p. 915)
   (c) Isbell's method (Journal of Research of the National Bureau of Standards, 1952, vol. 48, p. 163)

(3) Sodium Borohydride Method:
   (Journal of the American Chemical Society, 1951, vol. 73, p. 2933)

According to the method of (1)(a), a mixture of aldose and alditol is obtained as the product. In the case where γ-lactone is used as the raw material, the content of aldose in said mixture is almost equal to that of alditol. In case of employing γ-lactone as the raw material, the content of alditol is more than that of aldose. 3-C-hydroxymethyl-3,5-didesoxy-L-lyxono-γ-lactone belongs to γ-lactone, and, therefore, this method cannot be utilized by the above-mentioned reason. Methods of (1)(b) and (1)(c) cannot be employed from a commercial point of view, since process of production is complex and long and, therefore, the yield of aldose as the final product is not desirable.

Methods of (2) and (3) are partially similar to the process of the present invention in regard to the following two points: i.e., the point that the reducing agent is sodium amalgam or sodium borohydride and the point that the pH of the reaction mixtures is maintained at from 3 to 4.

It has been found, however, by the inventors' research that 3-C-hydroxymethyl-3,5-didesoxy - L - lyxofuranose cannot be commercially produced from 3-C-hydroxymethyl-3,5-didesoxy-L-lyxono-γ-lactone with good yield by applying merely said two process conditions as they are.

In order to make the production possible the present inventors conducted many experiments, and as the result succeeded in finding various facts and conditions essential for constituting the present invention. Therefore, based on those facts and conditions, the present inventors invented the following invention, to attain the object. The details of the present inventors' research are described hereinafter and at the same time the present invention is illustrated in detail as follows:

As the result of reaserch, the present inventors have succeeded in preparing 3-C-hydroxymethyl-3,5-didesoxy-L-lyxono-γ-lactone (dihydrodesoxystreptosonic acid monolactone) by decomposing dihydrodesoxystreptomycin as reported in Proceedings of the Japan Academy (1956), vol. 32, pp. 48–58. An aqueous solution of thus prepared 3-C-hydroxymethyl-3,5-didesoxy-L-lyxono-γ-lactone was reduced with sodium amalgam or sodium borohydride while varying the pH of the reaction mixture. Thereafter, the quantity of 3-C-hydroxymethyl-3,5-didesoxy-L-lyxofuranose present in the reaction mixture after completion of the reaction was determined by Anthrone method invented by the present inventors. (This quantitative determination method will be explained in detail afterwards.)

The above experimental results of the research is shown in the following table.

TABLE 1

| A case of using sodium amalgam | | A case of using sodium borohydride | |
| --- | --- | --- | --- |
| The pH value of the reaction mixture | Yield of 3-C-hydroxymethyl-3,5-didesoxy-L-lyxofuranose (percent) | The pH value of the reaction mixture | Yield of 3-C-hydroxymethyl-3,5-didesoxy-L-lyxofuranose (percent) |
| 2.4–4.0 | 93.3 | 2.0–4.0 | 80.6 |
| 4.1–6.0 | 85.0 | 4.1–6.0 | 40.2 |
| 6.1–7.5 | 60.0 | 6.1–7.5 | 7.1 |

In the above-mentioned experiment, the pH of the reaction mixture was adjusted by adding sulfuric acid. The reaction temperature was adjusted within the range of from 10° to 15° C. By such means, it has been found that in case of effecting reduction of 3-C-hydroxymethyl-3,5-didesoxy-L-lyxono-γ-lactone with sodium amalgam or sodium borohydride, 3-C-hydroxymethyl-3,5-didesoxy-L-lyxofuranose may be produced with high yield (in case of employing sodium amalgam the yield is 93% and in case of employing sodium borohydride it is 80%) by maintaining constantly the pH of the reaction mixture within the range at from 2.0 to 4.0.

According to the inventors' research, it has been found that when 3-C-hydroxymethyl-3,5-didesoxy-L-lyxono-γ-lactone is dissolved in tetrahydrofuran and reduced with lithium aluminum hydride (LiAlH$_4$) the quantity of 3-C-hydroxymethyl - 3,5 - didesoxy-L-lyxofuranose formed is only within the range of from 20 to 30% of the calculated amount and therefore the method cannot be said to be an advantageous one as an industrial process.

The relation of the reaction period with the quantity of 3 - C-hydroxymethyl-3,5-didesoxy-L-lyxofuranose formed in an experiment employing as said reducing agent sodium amalgam or sodium borohydride is shown in the following table.

TABLE 2

| A case of using sodium amalgam | | A case of using sodium borohydride | |
| --- | --- | --- | --- |
| Reaction period | Yield of 3-C-hydroxymethyl-3,5-didesoxy-L-lyxofuranose (percent) | Reaction period | Yield of 3-C-hydroxymethyl-3,5-didesoxy-L-lyxofuranose (percent) |
| 10 min | 15.4 | 5 min | 31.3 |
| 30 min | 43.5 | 10 min | 77.6 |
| 1 hour | 78.4 | 20 min | 80.3 |
| 2 hours | 90.2 | 30 min | 80.5 |
| 3 hours | 93.1 | 1 hour | 80.6 |
| 5 hours | 93.3 | | |

As being clear from the above table, in the case where the reducing agent is sodium amalgam, the reaction period shall be longer than that of the case where sodium borohydride is employed, but the yield of 3-C-hydroxymethyl-3,5-didesoxy-L-lyxofuranose of the former case is higher than that of the latter case.

Then, according to the present inventors' experiment gluconolactone was reduced with either of sodium amalgam or sodium borohydride while maintaining the pH of the reaction mixture at from 2 to 4.

Glucose formed by said reductive reaction was quantitatively determined by use of Willstatter and Schudel's method. As to the reaction period, it took about 1 hour in case of sodium amalgam and about 20 minutes in case of sodium borohydride to make the glucose quantity highest (the highest yield was 75%).

As described above, in the case where 3-C-hydroxymethyl-3,5-didesoxy-L-lyxono-γ-lactone as the raw material is reduced with sodium amalgam or sodium borohydride to produce 3-C-hydroxymethyl-3,5-didesoxy-L-lyxofuranose according to the process of the present invention, the reaction velocity is generally lower than that in case of converting other aldonolactone into aldose. It is presumed to be a particularly different point from each other.

Furthermore, such reaction period as stated above changes in considerably wide range by difference of various conditions, i.e. the temperature of reaction mixture, stirring rate, the quantity of the reducing agent added and times of its addition, and method of adjusting the pH, etc. Accordingly, it is absolutely impossible to make the previously defined reaction period a mark of completion of the reaction in the present invention. Therefore, in order to obtain the 3-C-hydroxymethyl-3,5-didesoxy-L-lyxofuranose with the highest yield according to the present invention, a method suitable enough to inform of completion or the terminal of the reaction is essential.

The present inventors studied on a method of quantitative determination of 3-C-hydroxymethyl-3,5-didesoxy-L-lyxofuranose in the reaction mixture for the purpose of finding the terminal of the reaction, and as the result found a quite simple and correct quantitative determination method.

The development and actual circumstances of finding this quantitative determination are described hereinafter.

At first, the inventors made researches in applying the following well-known quantitative determination methods to quantitative determination of 3-C-hydroxymethyl-3,5-didesoxy-L-lyxofuranose in the early stages of their researches.

(1) Willstatter and Schudel's Methods:
(Berichte der deutschen chemischen Gesellshaft, 1918, 1i, p. 780)

(2) Goebel's Method:
(Journal of the Biological Chemistry, 1927, vol. 72, p. 801)

(3) Isbell's Method:
(Journal of Research of the National Bureau of Standards, 1940, vol. 24, p. 241)

Result of the researches is illustrated as follows: that is, the above-mentioned methods (1), (2) and (3) may be satisfactorily used in the case where glucose formed in the reaction mixture by reduction of gluconolactone with sodium amalgam or sodium borohydride while maintaining the pH of the reaction mixture at the range of from 2 to 4 is quantitatively determined. However, the quantity of 3-C-hydroxymethyl-3,5-didesoxy-L-lyxofuranose formed in the reaction mixture by reduction of 3-C-hydroxymethyl-3,5-didesoxy-L-lyxono-γ-lactone with sodium amalgam or sodium borohydride within the pH range of the reaction mixture is from 2 to 4 is unable to be determined by the method of (1) or (2) because of the consumption of iodine used as a reagent is extremely small. Therefore, in these two analytical procedures, judging from the result of quantitative determination it seems that 3-C-hydroxymethyl - 3,5 - didesoxy-L-lyxofuranose is produced merely in a small amount. Thus, it has been found that methods of (1) and (2) cannot be employed in said case. Even though quantitative determination is effected by the method of (3) the quantity of 3-C-hydroxymethyl-3,5-didesoxy-L-lyxofuranose is too small.

With regard to the above experimental result, the present inventors presume that quantitative determination methods of (1), (2) and (3) are effected by alkali process, but as 3-C-hydroxymethyl-3,5-didesoxy-L-lyxofuranose has a quite unstable property against alkali, decomposition reaction occurs in the early stage of the quantitative determination process and therefore the value obtained becomes remarkably small.

Accordingly, the inventors have considered that 3-C-hydroxymethyl - 3,5 - didesoxy-L-lyxofuranose formed in said reduction reaction mixture may be quantitatively determined by applying so-called anthrone method in which anthrone and sulfuric acid are used among the methods of quantitative determination of aldose other than the above-described methods of (1), (2) and (3) and made basic researches in regard to it. As the result of the researches made by the inventors, the following various, novel facts have been found.

(1) As the result of effecting color reaction of 3-C-hydroxymethyl-3,5-didesoxy-L-lyxofuranose by use of anthrone and sulfuric acid, it has been found that this compound, even in a slight amount, changes its colour extremely clear red, and the coloration has absorption maximum at the wave length of 528 mμ. Furthermore, it has been found that the calibration curve obtained by the present compound conforms well to the Beer-Lambert law.

(2) Methyl-diacetyl-3-C-hydroxymethyl-3,5 - didesoxy-L-lyxofuranoside (III) or ethyl-thio-diacetyl - 3 - C - hydroxymethyl-3,5-didesoxy - L - lyxofuranoside (IV) and their deacetylated compounds, such as methyl-3-C-hydroxymethyl - 3,5 - didesoxy - L - lyxofuranoside (V) and ethyl-thio-3-C-hydroxymethyl - 3,5 - didesoxy-L-lyxofuranoside (VI), or else several mercaptals of 3-C-hydroxymethyl-3,5-didesoxy-L-lyxofuranose (VII) causes colour reaction by anthrone and sulfuric acid as in the above case (1). For reference the following is described. These derivatives are stable without decomposition of their structure by alkali, but have no reductive group in the molecules. Therefore, they cannot be quantitatively determined by the above-described Willstatter and Schudel's method, Goebel's method, or Isbell's method.

(3) 3-C-hydroxymethyl - 3,5 - didesoxy - L - lyxono-γ-lactone does not form any colours at all by reaction with anthrone and sulfuric acid.

(4) Presence of inorganic substances such as sodium sulfate, sodium chloride and mercuric chloride does not obstruct this colour reaction.

Founded on the finding of these facts, the present inventors proceeded researches relating to quantitative determination of 3-C-hydroxymethyl-3,5-didesoxy-L-lyxofuranose or its derivatives present together with the above-mentioned impurities, and at last succeeded in finding such a quantitative determination method as follows: i.e. a quantitative determination method of 3-C-hydroxymethyl-3,5-didesoxy-L-lyxofuranose and its derivatives, which comprises treating 3-C-hydroxymethyl - 3,5 - didesoxy-L-lyxofuranose or its derivatives present together with impurities in a mixture, with sulfuric acid and anthrone to cause color reaction, measuring the absorbance of the resulting material at the wave length of 528 mμ and thereafter comparing the measured value with the calibration curve representing the relation between absorbance and its concentration at the wave length of 528 mμ obtained by treating an aqueous solution of pure 3-C-hydroxymethyl-3,5-didesoxy-L-lyxofuranose with sulfuric acid and anthrone in the same manner as in the above case.

As described above, according to the present invention, anthrone method invented by the present inventors is employed for quantitatively determining 3-C-hydroxymethyl-3,5-didesoxy-L-lyxofuranose present in an impure form in the reaction mixture, and therefore the object can be attained more correctly and promptly and the terminal of the reaction can be determined more easily than in cases of employing any other quantitative determination methods. Accordingly, in the present invention the reaction period when 3-C-hydroxymethyl - 3,5 - didesoxy-L-lyxofuranose is formed with the highest yield may be correctly determined.

3-C-hydroxymethyl-3,5-didesoxy-L - lyxofuranose thus formed is present in an impure form in the reaction mixture and worthless to be utilized. The inventors, therefore made a study on isolating 3-C-hydroxymethyl-3,5-didesoxy-L-lyxofuranose formed according to the above-described reduction process from the resulting reaction mixture in a pure form and succeeded in obtaining various good results, which are described in detail hereinafter.

The reaction mixture produced by the process of the present invention includes the following components: i.e. 3-C-hydroxymethyl-3,5-didesoxy-L-lyxofuranose which is the object material, un-reacted 3-C-hydroxymethyl-3,5-didesoxy-L-lyxono-γ-lactone, sodium sulfate and mercury, etc. Among said substances, mercury can be easily removed and sodium sulfate may be separated from the reaction mixture by concentrating the reaction mixture and cooling or adding a water-miscible solvent to the resulting concentrate. Sodium sulfate may also be removed by use of ion-exchange resin. However, it is difficult to remove un - reacted 3 - C-hydroxymethyl-3,5-didesoxy-L-lyxono-γ-lactone.

For example, Emil Fischer employed the following method for removing un-reacted lactone after completion of the reaction in an experiment in which ribose was obtained by reduction of ribonolactone, as described in Berichte der deutschen chemischen Gesellschaft (1891), vol. 24, p. 4220.

That is, sodium hydroxide is added to the reaction liquid to be strong alkaline, whereby lactone is hydrolyzed to convert it into its sodium salt. Thereafter, alcohol, is added into the resulting reaction mixture, thereby to remove sodium ribonate.

In an experiment in which arabinose is produced by reducing arabonolactone Sperber (Journal of American Chemical Society, 1947, vol. 69, p. 917) removed unreacted arabono lactone, without making the reaction mixture strong alkaline as in the above-mentioned Fischer's method, by using phenolphthalene as an indicator and adding sodium hydroxide until it turns to red, hydrolyzing un-reacted arabono lactone to the sodium salt of arabonic acid and effecting the same treatment as in Fischer's method.

Then, according to Isbell's method (Journal of Research of the National Bureau of Standards, 1953, vol. 51, p. 310), sodium hydroxide is added into the reaction mixture until it turns to pink by use of phenolphthalene as an indicator in order to hydrolyze un-reacted lactone in the same manner as in said Sperber's method.

Thereafter, sodium salt of the acid formed by the hydrolysis is treated with a mixture of cationic and anionic ion-exchange resins to effect deionization. Thus, un-reacted lactone is removed.

The present inventors have tried to remove un-reacted 3-C-hydroxymethyl-3,5-didesoxy-L-lyxono-γ-lactone present in the reaction mixture by the above-indicated methods in the early stage of their researches and found that by adding sodium hydroxide to make the pH of the reaction mixture from 7.1 to 7.5 the mixture turns promptly to yellowish brown and the resulting 3-C-hydroxymethyl-3,5-didesoxy-L-lyxofuranose present together with above-mentioned lactone in the reaction mixture is decomposed. As it has been found that 3-C-hydroxymethyl-3,5-didesoxy-L-lyxofuranose is extremely unstable against alkali and decomposed promptly, it causes decomposition of 3-C-hydroxymethyl-3,5-didesoxy-L-lyxofuranose to make the reaction mixture strong alkaline as in said Fischer's method or to add alkali into the mixture (until it turns to pink (about 8.5 pH) by use of phenolphthalene as an indicator as in Sperber's method or Isbell's method in order to effect hydrolysis of un-reacted lactone by adding sodium hydroxide to the reaction mixture, therefore it must avoid to make the reaction mixture alkaline as in the above.

It has been found that as 3-C-hydroxymethyl-3,5-didesoxy-L-lyxofuranose formed according to the present invention has such a characteristic as being extremely unstable against alkali, un-reacted acid lactone present as an impurity in the reaction mixture can never be decomposed to acid for removing by applying treatment with alkali, which may be applied to merely comparatively stable succharaids against alkali and is employed for said various methods.

In the course of present inventors' researches, it has come to be necessary for the inventors to find a novel method of isolating 3-C-hydroxymethyl-3,5-didesoxy-L-lyxofuranose formed according to the present invention from the reaction mixture. Therefore, planning the following method, the present inventors have proceeded their researches and succeeded in attaining the object.

The inventors have made a study on a method comprising converting 3-C-hydroxymethyl-3,5-didesoxy-L-lyxofuranose formed in the reaction mixture to a derivative which is stable to alkali and may easily regenerate, while converting unreacted lactone to a compound capable of easy separation followed by removing, and thereafter subjecting said derivative to decomposition to form 3-C-hydroxymethyl-3,5-didesoxy-L-lyxofuranose and isolating it easily.

According to the inventors' researches, it has been found that methyl-diacetyl-3-C-hydroxymethyl-3,5-didesoxy-L-lyxofuranoside (III), ethyl-thio-diacetyl-3-hydroxymethyl-3,5-didesoxy-L-lyxofuranoside (IV) and several mercaptals of 3-C-hydroxymethyl-3,5-didesoxy-L-lyxofuranose (VII) are desirable as the derivatives of 3-C-hydroxymethyl-3,5-didesoxy-L-lyxofuranose which are stable to alkali and regenerate easily. Then, it has been confirmed that 3-C-hydroxymethyl-3,5-didesoxy-L-lyxofuranose may be isolated from these derivatives through a definite operation.

First, the case where methyl-diacetyl-3-C-hydroxymethyl-3,5-didesoxy-L-lyxofuranoside (III) is used is explained.

Mercury present at the bottom of the container is removed from the above-mentioned reaction mixture containing 3-C-hydroxymethyl-3,5-didesoxy-L-lyxofuranose formed by reaction. After adjusting the pH of the resulting reaction mixture to 5, it is concentrated and cooled to separate inorganic compounds, such as sodium sulfate and sodium chloride, etc. After removing said inorganic compounds, the filtrate is completely dried and reacted with methanolic hydrogenchloride to convert 3-C-hydroxymethyl-3,5-didesoxy-L-lyxofuranose to methyl-3-C-hydroxymethyl-3,5-didesoxy-L-lyxofuranoside. Then, excess hydrogen chloride is neutralized with methanolic sodium hydroxide to remove it as sodium chloride. Thereafter, the resulting filtrate is dried. The dried matter is, then, subjected to acetylation by use of acetic anhydride and pyridine as a reagent to form methyl-diacetyl-3-C-hydroxymethyl-3,5-didesoxy-L-lyxofuranoside (III).

During the above-mentioned reaction, 3-C-hydroxymethyl-3,5-didesoxy-L-lyxono-γ-lactone present in the mixture is converted to diacetyl-3-C-hydroxymethyl-3,5-didesoxy-L-lyxono-γ-lactone and is admixed with said methyl-acetyl-sugar (III). The mixture is dissolved into a solvent, such as butanol or chloroform, and washed with a 3% aqueous solution of sodium carbonate until the water layer turns to pink by phenolphthalene indicator, whereby said acetyl-lactone is decomposed into acetyl-acid and immediately converts to its sodium salt which is accumulated in the water layer. While, said methyl-acetyl-sugar (III) is not decomposed and remains in the solvent layer. After the solvent is evaporated, residual methyl-acetyl-sugar (III) is treated with alkali to effect deacetylation. Thereby methyl 3-C-hydroxymethyl-3,5-didesoxy-L-lyxonofuranoside (V) is produced. This material is again subjected to de-methylation to isolate the objective 3-C-hydroxymethyl-3,5-didesoxy-L-lyxofuranose in a pure form.

Then, the case where ethyl-thio-diacetyl-3-C-hydroxymethyl-3,5-didesoxy-L-lyxofuranoside (LV) is used is described as follows:

After completion of said reductive reaction mercury present at the bottom of the container is removed from the reaction mixture. Then, adjusting the pH of the reaction mixture to 5, it is concentrated and cooled, to separate inorganic compounds. After removing the separated inorganic compound, the filtrate is completely dried, dissolved into ethyl mercaptan, and saturated with dried hydrogen chloride gas. Then, it is neutralized with sodium carbonate, concentrated and subjected to acetylation with pyridine and acetic anhydride, thereby to produce ethyl-thio-diacetyl-3-C-hydroxymethyl-3,5-didesoxy-L-lyxofuranoside (IV).

During the reaction, 3-C-hydroxymethyl-3,5-didesoxy-L-lyxono-γ-lactone as an unreacted impurity contained in the mixture is present in form of acetyl-lactone in the mixture with said ethyl-thio-acetyl-sugar (IV). The mixture is dissolved into a solvent, such as butanol or chloroform, and washed with a 3% aqueous solution of sodium carbonate until the water layer turns to pink by phenolphthalene indicator, whereby said acetyl-lactone is deposed into acetyl-acid and immediately converts into its sodium salt which is accumulated in the water layer. While, said ethyl-thio-acetyl-sugar (IV) alone remains in the solvent layer. After the solvent is evaporated, residual ethyl-thio-acetyl-sugar (IV) is treated with alkali and subjected to de-acetylation to form ethyl-thio-3-C-hydroxymethyl-3,5-didesoxy-L-lyxofuranoside (VI). The present substance is treated with mercuric chloride and cadmium carbonate and subjected to de-ethyl-thiolation, whereby 3-C-hydroxymethyl-3,5-didesoxy-L-lyxofuranose is produced in pure form.

Then, the case where several mercaptals of 3-C-hydroxymethyl-3,5-didesoxy-L-lyxofuranose (VII) is used is illustrated in detail by an example.

From the reaction mixture, after completion of said reduction reaction, mercury at the bottom of the container is removed. Then, adjusting the pH of the reaction mixture to 5, the resulting mixture is concentrated and cooled to separate inorganic compounds. After removing the inorganic compounds, the filtrate is completely dried, and added with benzyl mercaptan and then concentrated hydrochloride to effect reaction. After completion of the reaction, an aqueous solution of sodium carbonate is added therein to adjust the pH of the mixture to about from 8 to 8.5. Thus, unreacted impurity contained in the reaction mixture, i.e. 3 - C-hydroxymethyl-3,5-didesoxy-L-lyxono-γ-lactone is hydrolyzed and immediately converted into its sodium salt, followed by collecting into the water layer. Benzyl-thio-3-C-hydroxymethyl-3,5-didesoxy-L-lyxofuranoside is not dissolved in water but is separated as an oil. Therefore, resulting benzyl-thio-3-C-hydroxymethyl-3,5-didesoxy-L-lyxofuranoside may be extracted with a solvent such as butanol or chloroform. Then, the extracted benzyl-thio-3-C-hydroxymethyl-3,5-didesoxy-L-lyxofuranoside is treated with mercuric chloride and mercuric oxide to effect de-mercaptalation, whereby pure 3-C-hydroxymethyl-3,5-didesoxy-L-lyxofuranose is obtained.

This method is more advantageous than the former two methods, since the length of the process is reduced to half.

In said method, the following mercaptans may be used; i.e. benzyl mercaptans, phenyl mercaptans, and alkyl mercaptans having the general formula $C_nH_{2n+1}SH$ wherein $n$ is an integer of more than 3.

Generally speaking, in the process of the present invention sulfuric acid, hydrochloric acid and phosphoric acid are desirably used as acids to be employed for adjusting the pH of the reaction mixture during the reductive reaction. However, any other acids may be used if the pH is maintained at from 2 to 4. The pH may be adjusted by use of a buffer solution. In the case where these processes are carried out, however, these acids or buffers should be removed from the reaction mixture. When these removing processes are too troublesome, yield of the object material becomes low.

It is clarified from Table 1 that maintaining the pH of the reaction mixture within the range of from 2 to 4 gives the best result. 3-C-hydroxymethyl-3,5-didesoxy-L-lyxofuranose is formed even in the case where the pH ranges from 1.8 to 1.9, but consumption rate of the reducing agent is so rapid that adjustment of the pH is quite difficult.

In case of employing sodium amalgam as the reducing agent a reaction temperature ranging from about 10 to 15° C. can give the highest yield of the product and the shortest reaction period. In case of using sodium borohydride as the reducing agent it is desirable to carry out the reaction at a temperature ranging from 0° to 5° C. In the case where the temperature is higher than the above, adjustment of the pH becomes difficult. When the temperature is too low, the reaction period becomes extremely long, which is a disadvantageous point.

Applying the above-described facts of findings, the present inventors have completed the present invention. Present invention relates to a process for producing a pure 3-C - hydroxymethyl - 3,5-didesoxy-L - lyxofuranose which comprises reducing an aqueous solution of 3-C-hydroxymethyl-3,5-didesoxy-L-lyxono-γ-lactone to form 3-C-hydroxymethyl-3,5-didesoxy-L-lyxofuranose with either of sodium amalgam or sodium borohydride while maintaining the pH of the reaction mixture at from 2 to 4, converting impure 3-C-hydroxymethyl-3,5-didesoxy-L-lyxofuranose formed in the reaction mixture into methyl-diacetyl-3-C-hydroxymethyl-3,5-didesoxy-L-lyxofuranoside or ethyl - thio-diacetyl-3-C-hydroxymethyl-3,5-didesoxy-L-lyxofuranoside, or several mercaptals of 3-C-hydroxymethyl-3,5-didesoxy-L-lyxofuranose, recovering the pure 3-C-hydroxymethyl-3,5-didesoxy-L-lyxofuranose by decomposing said derivatives thus formed. By the above-mentioned process, 3-C-hydroxymethyl-3,5-didesoxy-L-lyxofuranose may easily be prepared and isolated.

The present invention is illustrated by the following examples, however, it must be understood that the invention is not limited to the scope of the examples.

Example 1

10 g. of 3-C-hydroxymethyl-3,5-didesoxy-L-lyxono-γ-lactone (M.P. 54-56° C.) are dissolved in 200 ml. of water. To the resulting solution are added 350 g. of sodium amalgam pellets (5-10 mesh; 2.5% sodium content). The mixture is stirred during which time the pH of the reaction mixture being adjusted to 2-4 with 4 N sulfuric acid. For preventing rising of the temperature the reaction mixture is cooled by ice and the temperature is maintained at 10° to 15° C. After about 1 hour, 3-C-hydroxymethyl-3,5 - didesoxy - L-lyxofuranose formed is quantitatively determined by anthrone method invented by the present inventors. It is about 78%. The embodiment of this quantitative determination method is illustrated in detail by the following examples. Then, 150 g. of said sodium amalgam are added again into the reaction mixture, and after 1 hour, 3 - C-hydroxymethyl-3,5-didesoxy-L-lyxofuranose formed is 90%. Further, 100 g. of sodium amalgam are added to carry out the reaction, while maintaining constantly the pH of the reaction mixture at from 2 to 4. After about 3 hours from the beginning of reaction, 3 - C-hydroxymethyl-3,5-didesoxy-L-lyxofuranose formed in the reaction mixture is determined by anthrone method. The sugar content was about 93%. In such a period the reaction is completed and mercury separated at the bottom of the container is removed from the reaction mixture. The resulting reaction mixture is concentrated up to 1/6 by volume, and standing over night at a temperature ranging from 0 to 2° C. to separate crystals of sodium sulfate. The crystals of sodium sulfate are removed from the reaction mixture and to this filtrate are added about 30 cc. methanol. The mixture is stood for 2 to 3 hours to separate completely sodium sulfate crystals, followed by filtering off. The filtrate is completely dried, to form colorless syrup of 3 - C - hydroxymethyl-3,5-didesoxy-L-lyxofuranose containing the un-reacted starting material.

Example 2

200 ml. of 1 N methanolic hydrogen chloride are added to the syrup obtained in Example 1. The mixture is stood at room temperature for 24 hours and thereafter methanolic sodium hydroxide is added to neutralize it. Crystals of sodium chloride formed are removed by filtration and the resulting filtrate is dried. To this residue 30 ml. of acetic anhydride and 30 ml. of anhydrous pyridine are added. After standing at room temperature for 24 hours, pyridine and acetic anhydride are completely removed from the reaction mixture. The resulting residue is dissolved into 100 ml. of chloroform and washed with a 3% aqueous solution of sodium carbonate. The water layer is examined by phenolphthalene indicator and when it turns to pink, washing is stopped. After drying the solvent layer chloroform is evaporated whereby 11.8 g. of the residue, that is, methyl - diacetyl - 3 - C - hydroxymethyl - 3,5 - didesoxy-L-lyxofuranoside (III) are obtained.

*Analysis.*—Calcd. for $C_{11}H_{18}O_6$: C, 53.65%; H, 7.37%. Found: C, 52.78%; H, 7.45%.

Purity: 99.6% (determined by anthrone method invented by the present inventors, which is illustrated in detail by the following examples).

Thus obtained methyl-diacetyl-3-C-hydroxymethyl-3,5-didesoxy-L-lyxofuranoside is dissolved in 50 ml. of anhydrous methanol and to this solution are added about 10 ml. of 1.5 N barium methylate ($Ba(OCH_3)_2$) solution under cooling by ice. After standing the mixture at 0° C. for 1 hour, it is stood further for 20 hours at room temperature. Then, passing carbonic acid gas, barium is precipitated as barium carbonate and removed by filtration. Thereafter, the resulting filtrate is concentrated and dried, to form 7.4 g. of oily methyl-3-C-hydroxymethyl-3,5-didesoxy-L-lyxofuranoside (V).

*Analysis.*—Calcd. for $C_7H_{14}O_4$: C, 51.84%; H, 8.70%. Found: C, 51.37%; H, 8.45%.

Purity: 99.5%.

This substance is dissolved in 100 ml. of a 25% hydrochloric acid, stood at 50° C. for 5 hours. Thereafter, silver carbonate is added to remove chlorine ion as a precipitate of silver chloride. Trace of silver ion remaining in the solution is removed with hydrogen sulfide, and the resulting solution is concentrated and dried whereby 6.0 g.

of 3 - C-hydroxymethyl-3,5-didesoxy-L-lyxofuranose are obtained as a colorless syrup.

$[\alpha]_D^{21} = +11.40$ (c.=1, $CH_3OH$)

Analysis.—Calcd. for $C_6H_{12}O_4$: C, 48.64%; H, 8.16%. Found: C, 48.28%; H, 7.94%.

Purity: 99.85%.

Example 3

15 g. of 3-C-hydroxymethyl-3,5-didesoxy-L-lyxono-γ-lactone is dissolved in 200 ml. of water. The solution is cooled at about 0° C. and to this solution a solution of 2 g. of sodium borohydride in 50 ml. of water is added dropwise. Then, the mixture is stirred during which time pH of the reaction mixture being adjusted to 2–4 with 2 N hydrochloric acid. At that time the temperature should be maintained at from 0 to 4° C. Above-mentioned addition of sodium borohydride is completed in about 15 minutes. Then, 3-C-hydroxymethyl-3,5-didesoxy-L-lyxofuranose formed in the reaction mixture is quantitatively determined by anthrone method of the present invention. The content is 78%. Additional 1 g. of sodium borohydride is dissolved in 25 ml. of water and the solution is added gradually into the reaction mixture. The pH of the reaction mixture is adjusted as before. After 30 minutes from the beginning of the reaction, the amount of 3-C-hydroxymethyl-3,5-didesoxy-L-lyxofuranose is determined by anthrone method. The content is about 81%. In such a period, the reaction is completed and mercury separated at the bottom of the container is removed. The resulting solution is concentrated up to 50 ml. and standing over night at a temperature ranging from 0 to 2° C. to separate crystals of sodium chloride. After removing crystals of sodium chloride, about 50 ml. of methanol are added to the reaction mixture and stood for 2–3 hours, whereby sodium chloride is completely separated. The resulting crystals are removed by filtration. The filtrate is completely dried to yield 3-C-hydroxymethyl - 3,5 - didesoxy - L-lyxofuranose containing un-reacted starting materials as a colorless syrup.

Example 4

The syrup obtained in Example 2 is dissolved in 100 ml. of ethyl mercaptan, saturated with dried hydrochloric acid gas, stood at room temperature for 24 hours, neutralized with sodium carbonate. Then, ethyl mercaptan is removed from the mixture by concentration, and 50 ml. of acetic anhydride and 50 ml. of anhydrous pyridine are added to this concentrate. The mixture is stood at room temperature for 24 hours. Thereafter, acetic anhydride and pyridine are completely removed from the reaction mixture. The residue is dissolved in 120 ml. of butanol and washed with a 3% aqueous solution of sodium carbonate. The water layer is tested by phenolphthalene indicator, and when it turns to pink washing is stopped. Then, butanol is removed by evaporation. Thus obtained residue, i.e. ethyl - thio - diacetyl-3-C-hydroxymethyl-3,5-didesoxy-L-lyxofuranoside (IV) is 18.4 g.

Analysis.—Calcd. for $C_{12}H_{20}O_5S$: C, 52.15; H, 7.30. Found: C, 52.03; H, 6.91.

Purity: 99.4%.

The present substance is dissolved into 50 ml. of anhydrous methanol and to this solution about 16 ml. of 1.5 N barium methylate are added under cooling with ice. For 1 hour, the mixture is stood at 0° C. and further for 20 hours at room temperature. Passing carbonic acid gas, barium is removed as precipitate of barium carbonate. Then, the solution is concentrated, and dried to yield 12.0 g. of ethyl-thio-3-C-hydroxymethyl-3,5-didesoxy-L-lyxofuranoside (VI) as a colorless syrup.

Analysis.—Calcd. for $C_8H_{16}O_3S$: C, 49.97; H, 8.39. Found: C, 49.61; H, 8.50.

Purity: 99.6%.

This syrup is dissolved in 200 ml. of a 50% acetone and to this solution is added a mixture of 18 g. of mercuric chloride dissolved in 20 ml. of acetone and 20 g. of powdered cadmium carbonate (neutral) suspended in 50 ml. of 50% acetone. The resulting mixture is stirred at about 50° C. for 1 hour and standing over-night in an ice-box. After the precipitate is removed by a centrifugal, the resulting solution is concentrated to remove acetone, the residual aqueous solution is extracted with ether to remove excess mercuric chloride. Cadmium chloride produced as a by-product in the solution is removed as the precipitate of cadmium carbonate and silver chloride by adding silver carbonate to the solution. The resulting filtrate is concentrated to dryness, 7.8 g. of 3-C-hydroxymethyl-3,5-didesoxy-L-lyxofuranose are obtained as a colorless syrup.

$[\alpha]_D^{21} = +11.40$ (c.=1, $CH_3OH$)

Analysis.—Calcd. for $C_6H_{12}O_4$: C, 48.64; H, 8.16. Found: C, 48.46; H, 8.03.

Purity: 99.91%.

Example 5

10 g. of 3-C-hydroxymethyl-3,5-didesoxy-L-lyxono-γ-lactone (M.P. 54–56° C.) are dissolved in water. To the resulting solution is added sodium amalgam, and the mixture is stirred during which time the pH of the reaction mixture being adjusted to 2–4. 3-C-hydroxymethyl-3,5-didesoxy-L-lyxofuranose formed in the reaction mixture is determined by the anthrone method. When the content is reached to about 90–93%, the reaction is stopped. After removing mercury at the bottom of the container, the pH of the reaction mixture is adjusted to 5. Then, the resulting solution is concentrated and cooled to separate inorganic compounds. The inorganic compounds thus separated are removed by filtration and the resulting filtrate is completely dried. To this residue are added 17 ml. of benzyl mercaptan and then 17 ml. of concentrated hydrochloric acid under shaking at room temperature for 1–2 hours. After completion of the reaction, an aqueous solution of sodium carbonate is added to the mixture to adjust the pH to about 8–8.5, and is extracted into chloroform. The separated chloroform layer is washed with water, and dried with anhydrous sodium sulfate. Thereafter, chloroform is removed by evaporation and the resulting residue is washed with petroleum ether to remove benzyl mercaptan contained in the residue. Thus, 10.8 g. of benzyl-thio-3-C-hydroxymethyl-3,5-didesoxy-L-lyxofuranoside are obtained as a colorless syrup.

$[\alpha]_D^{17} = -116.7$ (c.=2, $C_2H_5OH$)

Analysis.—Calcd. for $C_{13}H_{18}O_3S$: C, 61.39%; H, 7.13%; S, 12.57%. Found: C, 61.16%; H, 7.01%; S, 13.01%.

Purity: 99.6% (determined by the anthrone method of the present invention).

This compound is dissolved in 100 ml. of acetone and to this solution are added 10 ml. of water. Thereafter, 20.7 g. of mercuric oxide and 35.4 g. of mercuric chloride are added in order to the mixture. After shaking at room temperature for 1 hour, the mixture is maintained at 40° C. for 3 hours, and standing over-night at room temperature. Then, resulting precipitates are removed by filtration and acetone is removed from the filtrate and the residual solution is sufficiently extracted with ether to remove residual mercuric chloride. Thus, 4.5 g. of 3-C-hydroxymethyl-3,5-didesoxy-L-lyxofuranose are obtained as a colorless syrup.

$[\alpha]_D^{21} = +11.40$ (c.=1, $CH_3OH$)

Analysis.—Calcd. for $C_6H_{12}O_4$: C, 48.64%; H, 8.16%. Found: C, 48.28%; H, 7.94%.

Purity: 99.88% (determined by said anthrone method).

Example 6

In Example 5, after completion of reductive reaction mercury and inorganic compounds are removed from the reaction mixture. Then, the mixture is completely dried and to this residue are added 17 ml. of phenyl mercaptan and 17 ml. of concentrated hydrochloric acid. After carrying out the reaction at room temperature for 1 hour, an aqueouus solution of sodium carbonate is added to the reaction mixture to adjust the pH of the mixture to about 8.0 and then extracted with chloroform. The chloroform layer is washed with water and dried to remove chloroform. The residue is washed with petroleum ether to obtain 8.2 g. of phenyl-thio-3-C-hydroxymethyl-3,5-didesoxy-L-lyxofuranoside as a colorless syrup.

*Analysis.*—Calcd. for $C_{12}H_{16}O_3S$: C, 59.97%; H, 6.71%; S, 13.34%. Found: C, 59.67%; H, 6.75%; S, 14.12%.

This compound is subjected to demercaptalation by the same procedure as in Example 5, whereby 3.9 g. of 3-C-hydroxymethyl-3,5-didesoxy-L-lyxofuranose are obtained.

$$[\alpha]_D^{21} = +11.40 \ (c.=1, CH_3OH)$$

*Analysis.*—Calcd. for $C_6H_{12}O_4$: C, 48.64%, H, 8.16%. Found: C, 48.64%; H, 8.43%.

Purity: 99.82% (determined by said anthrone method).

Example 7

In Example 5, after completion of the reductive reaction mercury and inorganic compounds are removed from the reaction mixture. Then, the mixture is sufficiently dried and to this residue are added 15 ml. of normal-amyl mercaptan and 15 ml. of concentrated hydrochloric acid. After carrying out this reaction at room temperature for 1 hour, an aqueous solution of sodium carbonate is added to the resulting mixture to adjust the pH of the mixture to about 8 and extracted with chloroform. When chloroform and normal-amyl mercaptan are removed from the chloroform layer 9.3 g. of amyl-thio-3-C-hydroxymethyl-3,5-didesoxy-L-lyxofuranoside are obtained as a syrup.

*Analysis.*—Calcd. for $C_{11}H_{22}O_3S$: C, 56.37%; H, 9.46%; S, 13.68%. Found: C, 56.55%; H, 9.61%; S, 13.81%.

This substance is subjected to demercaptalation by the same procedure as in Example 5, whereby 4.4 g. of 3-C-hydroxymethyl-3,5-didesoxy-L-lyxofuranose are obtained.

*Analysis.*—Found for $C_6H_{12}O_4$: C, 48.33%; H, 8.11%.

Purity: 99.81% (determined by the above-mentioned anthrone method).

Example 8

Same procedures as in Example 7 are carried out except that 19 ml. of normal-heptyl mercaptan (the amount of concentrated hydrochloric acid employed is also 19 ml.) are used in place of normal-amyl mercaptan. Thus, 11 g. of heptyl-thio-3-C-hydroxymethyl-3,5-didesoxy-L-lyxofuranoside are obtained.

*Analysis.*—Calcd. for $C_{13}H_{26}O_3S$: C, 59.50%; H, 9.99%; S, 12.22%. Found: C, 60.12%; H, 10.31%; S, 12.72%.

The resulting substance is subjected to demercaptalation in the same manner as in Example 5, thereby to yield 4.3 g. of 3-C-hydroxymethyl-3,5-didesoxy-L-lyxofuranose.

*Analysis.*—Found for $C_6H_{12}O_4$: C, 48.35%; H, 8.33%.

Purity: 99.85% (determined by said anthrone method).

Example 9

10 g. of 3-C-hydroxymethyl-3,5-didesoxy-L-lyxono-γ-lactone are dissolved in 220 ml. of water. To the resulting solution are added 350 g. of sodium amalgam (sodium content 2.5%). The mixture is stirred during which time the pH of the reaction mixture being adjusted to 2–4 with 4 N sulfuric acid. The temperature is maintained at 10° to 15° C. by cooling with ice not to raise the temperature during reaction. After about 1 hour, the quantity of the reaction mixture is 300 cc. 1 ml. of the mixture is taken out and to this mixture is added distilled water and filled up to 500 ml. On the other hand, a reagent prepared by dissolving 200 mg. of pure anthrone (having the melting point of 155° C.) into 100 ml. of analytical grade sulfuric acid (98%, specific gravity 1.84) is poured into two regular test tubes, each by 10 ml. Then, said tubes are cooled by putting in an ice-water bath. Into one of them, 5 ml. of said sample solution is added along the wall of the tube. Into the other test tube, distilled water in place of the above-mentioned sample solution is added by the same procedure as in the above case. After addition, contents of the tubes are gradually shaken in an ice-water bath until it is thoroughly mixed. Thereafter, an air condenser is attached to each of tubes, heated for 25 minutes in a boiling water bath, then return them to an ice-water bath until the contents are cooled to room temperature. By measuring the absorbance of the wave length of 528 mµ against blank, 0.27 of the value of absorbance is obtained. The quantity of 3-C-hydroxymethyl-3,5-didesoxy-L-lyxofuranose corresponding to the said value of absorbance is determined by the calibration curve as 0.265 mg./5 cc.

Accordingly, the total amount of 3-C-hydroxymethyl-3,5-didesoxy-L-lyxofuranose present in the reaction mixture is shown as follows:

$$\frac{0.265 \text{ mg.}}{5} \times 500 \times 300 = 7950 \text{ mg.}$$

Provided that starting materials are all reduced, the total amount of said lyxofuranose is determined as follows:

$$1000 \text{ mg.} \times \frac{148.16}{146.14} = 10138 \text{ mg.}$$

Accordingly, the yield is shown as follows:

$$\frac{7950}{10138} \times 100 = 78.4\%$$

Therefore, it can be understood that the quantity of 3-C-hydroxymethyl-3,5-didesoxy-L-lyxofuranose formed in the reaction mixture is 78.4%, compared with the quantity of 3-C-hydroxymethyl-3,5-didesoxy-L-lyxofuranose formed in the case where the starting materials are all reduced.

Then, when additional 150 g. of sodium amalgam are added to the reaction mixture and the quantity of 3-C-hydroxymethyl-3,5-didesoxy-L-lyxofuranose formed in the reaction mixture after 1 hour is determined, it is 90.2%.

Further, 100 g. of sodium amalgam are added to the reaction mixture and after 3 hours from the beginning of the reaction quantitative determination is effected as in the above case. The quantity of the sugar is 93.1%. In succession the reaction liquid is reduced for 2 hours by use of 100 g. of sodium amalgam, but the quantity is 93.3%.

Further, reduction is effected by employing 100 g. of sodium amalgam for 2 hours the quantity does not change at all.

As the result of the above-mentioned quantitative determination, it is judged that the reductive reaction may be stopped after 3 hours from the beginning of the reaction and 3-C-hydroxymethyl-3,5-didesoxy-L-lyxofuranose may be produced with 93.1% yield.

Example 10

A sample solution is prepared by dissolving 2 mg. of ethyl-thio-diacetyl-3-C-hydroxymethyl-3,5-didesoxy-L-lyxofuranoside ($C_{12}H_{20}O_5S=276.36$) in 25 ml. of a mixture of methanol and water (2:3). On the other hand, an anthrone-sulfuric acid reagent used in Example 9 is poured into two test tubes, each by 10 ml. 5 ml. of the sample solution are added to a test tube while cooling by ice, and another test tube is used for the blank test.

Thereafter, the contents of these tubes are heated and cooled in the same manner as in Example 9. Then, absorbance is measured at the wave length of 528 mµ, to determine the quantity of 3-C-hydroxymethyl-3,5-didesoxy-L-lyxofuranose corresponding to said value from the calibration curve. The quantity of said lyxofuranose is 0.214 mg./5 cc.

The quantity of ethyl-thio-diacetyl-3-C-hydroxymethyl-3,5-didesoxy-L-lyxofuranoside is calculated thereby, as follows:

$$\frac{0.214 \text{ mg.}}{5} \times 25 = 1.07 \text{ mg.}$$

$$1.07 \text{ mg.} \times \frac{276.36}{148.16} = 1.99 \text{ mg.}$$

Accordingly, purity of the sample may be calculated by the following formula: that is, $$P = \frac{1.99}{2} \times 100 = 99.5\%$$

What we claim are:

1. 3-C-hydroxymethyl-3,5-didesoxy-L-lyxofuranose.
2. Methyl - diacetyl - 3 - C - hydroxymethyl - 3,5 - didesoxy-L-lyxofuranoside.
3. Ethyl - thio - diacetyl - 3 - C - hydroxymethyl - 3,5-didesoxy-L-lyxofuranoside.
4. Methyl - 3 - C - hydroxymethyl - 3,5 - didesoxy - L-lyxofuranoside.
5. Ethyl - thio - 3 - C - hydroxymethyl - 3,5 - didesoxy-L-lyxofuranoside.
6. Benzyl - thio - 3 - C - hydroxymethyl - 3,5 - didesoxy-L-lyxofuranoside.
7. Phenyl - thio - 3 - C - hydroxymethyl - 3,5 - didesoxy-L-lyxofuranoside.
8. n - Amyl - thio - 3 - C - hydroxymethyl - 3,5 - didesoxy-L-lyxofuranoside.
9. n - Heptyl - thio - 3 - C - hydroxymethyl - 3,5 - didesoxy-L-lyxofuranoside.
10. A process for producing 3-C-hydroxymethyl-3,5-didesoxy-L-lyxofuranose, which comprises reducing an aqueous solution of 3-C-hydroxymethyl-3,5-didesoxy-L-lyxono-γ-lactone with a reducing agent selected from the group consisting of sodium amalgam and sodium borohydride, the pH of the reaction mixture being maintained at 2–4, and thereafter converting the 3-C-hydroxymethyl-3,5-didesoxy-L-lyxofuranose present in the reaction mixture to a derivative selected from the group consisting of methyl - diacetyl - 3 - C - hydroxymethyl - 3,5 - didesoxy - L - lyxofuranoside; ethyl-thio-diacetyl-3-C-hydroxymethyl - 3,5 - didesoxy - L - lyxfuranoside; methyl-3-C-hydroxymethyl-3,5-didesoxy-L-lyxofuranoside; ethyl-thio-3-C - hydroxymethyl - 3,5 - didesoxy - L - lyxofuranoside; benzyl - thio - 3 - C - hydroxymethyl - 3,5 - didesoxy - L-lyxofuranoside; phenyl - thio - 3 - C - hydroxymethyl - 3,5-didesoxy - L - lyxofuranoside; n- amyl - thio - 3 - C-hydroxymethyl - 3,5 - didesoxy - L - lyxofuranoside; and, n - heptyl - thio - 3 - C - hydroxymethyl - 3,5 - didesoxy-L-lyxofuranoside, removing said derivative by the process of solvent extraction from the said mixture, decomposing the said derivative to produce pure 3-C-hydroxymethyl-3,5-didesoxy-L-lyxofuranose and recovering the said lyxofuranose in purified from.
11. A process for obtaining pure 3-C-hydroxymethyl-3,5-didesoxy-L-lyxofuranose, which comprises converting 3-C-hydroxymethyl-3,5-didesoxy-L-lyxofuranose present in the reaction mixture produced as a result of the reduction process in claim 10 into methyl-diacetyl-3-C-hydroxymethyl-3,5-didesoxy-L-lyxofuranoside, deacetylating and then demethylating the resulting product.
12. A process for obtaining pure 3-C-hydroxymethyl-3,5-didesoxy-L-lyxofuranose, which comprises converting 3-C-hydroxymethyl-3,5-didesoxy-L-lyxofuranose present in the reaction mixture produced as a result of the reduction process in claim 10 into ethyl-thio-diacetyl-3-C-hydroxymethyl-3,5-didesoxy-L-lyxofuranoside, de-acetylating and then de-mercaptalating the resulting product.
13. A process for obtaining pure 3-C-hydroxymethyl-3,5-didesoxy-L-lyxofuranose, which comprises converting 3-C-hydroxymethyl-3,5-didesoxy-L-lyxofuranose present in the reaction mixture produced as a result of the reduction process in claim 10 into a derivative thereof selected from the group consisting of benzyl-thio-3-C-hydroxymethyl-3,5-didesoxy-L-lyxofuranoside, phenyl-thio-3 - C - hydroxymethyl - 3,5 - didesoxy - L - lyxofuranoside, and alkyl ($C_nH_{2n+1}$—; $n>3$)-thio-3-C-hydroxymethyl-3,5-didesoxy-L-lyxofuranoside, and de-mercaptalating the resulting product.
14. A process for obtaining pure 3-C-hydroxymethyl-3,5-didesoxy-L-lyxofuranose, which comprises converting 3-C-hydroxymethyl-3,5-didesoxy-L-lyxofuranose present in the reaction mixture produced as a result of the reduction process in claim 10 into a derivative thereof selected from the group consisting of n-amyl-thio-3-C-hydroxymethyl-3,5-didesoxy-L-lyxofuranoside, n-heptyl-thio - 3 - C - hydroxymethyl - 3,5 - didesoxy - L - lyxofuranoside, and de-mercaptalating the resulting product.
15. A method of quantitative determination of 3-C-hydroxymethyl-3,5-didesoxy-L-lyxofuranose and its derivatives, which comprises treating a substance selected from the group consisting of 3-C-hydroxymethyl-3,5-didesoxy-L-lyxofuranose, methyl-diacetyl-3-C-hydroxymethyl-3,5-didesoxy - L - lyxofuranoside, ethyl - thio-diacetyl-3-C-hydroxymethyl-3,5-didesoxy-L-lyxofuranoside, methyl-3-C-hydroxymethyl-3,5-didesoxy-L-lyxofuranoside, ethyl-thio-3-C-hydroxymethyl-3,5-didesoxy-L-lyxofuranoside, benzyl - thio - 3 - C - hydroxymethyl - 3,5 - didesoxy-L-lyxofuranoside, phenyl-thio-3-C-hydroxymethyl-3,5-didesoxy-L-lyxofuranoside, n-amyl-thio-3-C-hydroxymethyl-3,5-didesoxy-L-lyxofuranoside, n-heptyl-thio-3-C-hydroxymethyl-3,5-didesoxy-L-lyxofuranoside with anthrone and sulfuric acid to cause color reaction, measuring the absorbance at the wave length of 528 mμ, and, thereafter, comparing the measured value with the calibration curve prepared by applying said treatment with anthrone and sulfuric acid to a pure aqueous solution of 3-C-hydroxymethyl-3,5-didesoxy-L-lyxofuranose having known concentration.

References Cited

UNITED STATES PATENTS 3,196,147   7/1965   Kiss _____ 260—209

LEWIS GOTTS, *Primary Examiner.*

J. R. BROWN, *Assistant Examiner.*

UNITED STATES PATENT OFFICE
CERTIFICATE OF CORRECTION

Patent No. 3,356,674                                      December 5, 1967

Hiroshi Ikeda et al.

It is hereby certified that error appears in the above numbered patent requiring correction and that the said Letters Patent should read as corrected below.

Columns 1 and 2, strike out the reaction listed at the bottom of the page and insert the same before line 63, column 3; column 3, lines 55 to 62, after the formula insert the following as a new paragraph:

The method of the present invention is briefly illustrated by the following structure:

columns 1 and 2, formula I of the reaction should appear as shown below instead of as in the patent:

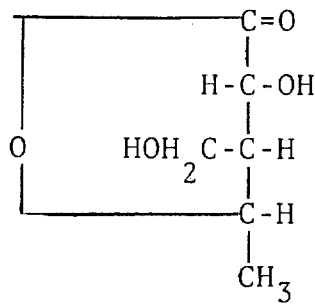

same columns 1 and 2, the last formula of the reaction should appear as shown below instead of as in the patent:

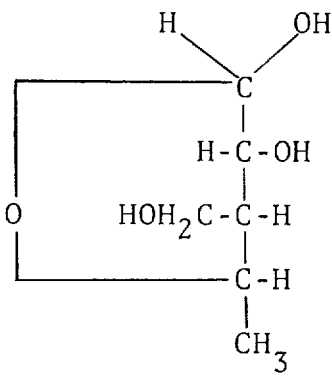

column 3, lines 14 to 20, the formula should appear as shown below instead of as in the patent:

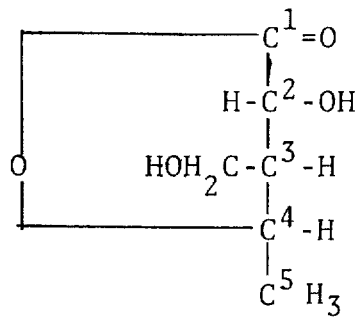

same column 3, lines 55 to 61, the formula should appear as shown below instead of as in the patent:

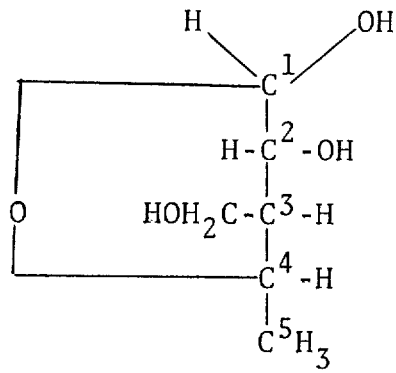

Signed and sealed this 22nd day of April 1969.

(SEAL)
Attest:

EDWARD M. FLETCHER, JR.
Attesting Officer

EDWARD J. BRENNER
Commissioner of Patents